United States Patent [19]  [11] 4,300,447
Hoover  [45] Nov. 17, 1981

[54] NUT BLANCHER

[75] Inventor: Maurice W. Hoover, Raleigh, N.C.

[73] Assignee: North Carolina State University at Raleigh, Raleigh, N.C.

[21] Appl. No.: 131,464

[22] Filed: Mar. 18, 1980

[51] Int. Cl.³ .............................................. A23N 5/01
[52] U.S. Cl. ........................................ 99/516; 99/528; 99/584; 99/630; 366/105; 366/173
[58] Field of Search .................................. 99/516–519, 99/521, 522, 525–531, 536, 584, 602–608, 630; 366/101, 105, 173, 233, 234

[56] References Cited

U.S. PATENT DOCUMENTS

| | | | |
|---|---|---|---|
| 790,909 | 5/1905 | McCann | 99/536 |
| 878,711 | 2/1908 | Dauch et al. | 366/105 |
| 1,206,258 | 11/1916 | Salomon | 99/516 |
| 1,280,879 | 10/1918 | Shannon | 99/584 |
| 3,992,148 | 11/1976 | Shore et al. | 99/516 |
| 4,132,162 | 1/1979 | Magnuson | 99/630 |

Primary Examiner—Philip R. Coe
Assistant Examiner—Timothy F. Simone
Attorney, Agent, or Firm—Cushman, Darby & Cushman

[57] ABSTRACT

A device and a method for either the continuous or the batchwise removal (blanching) of skins from peanuts and other nut products are provided. The nut blanching device includes a rotatable cylinder containing a structure for introducing at least one jet of air along the inside of the cylinder. By placing nuts in this cylinder, nuts are carried along by the rotation of the cylinder into a head-on collision with air from the air jet. The nuts are thus, blanched within the cylinder by a combination of abrasive forces and the force of air.

12 Claims, 8 Drawing Figures

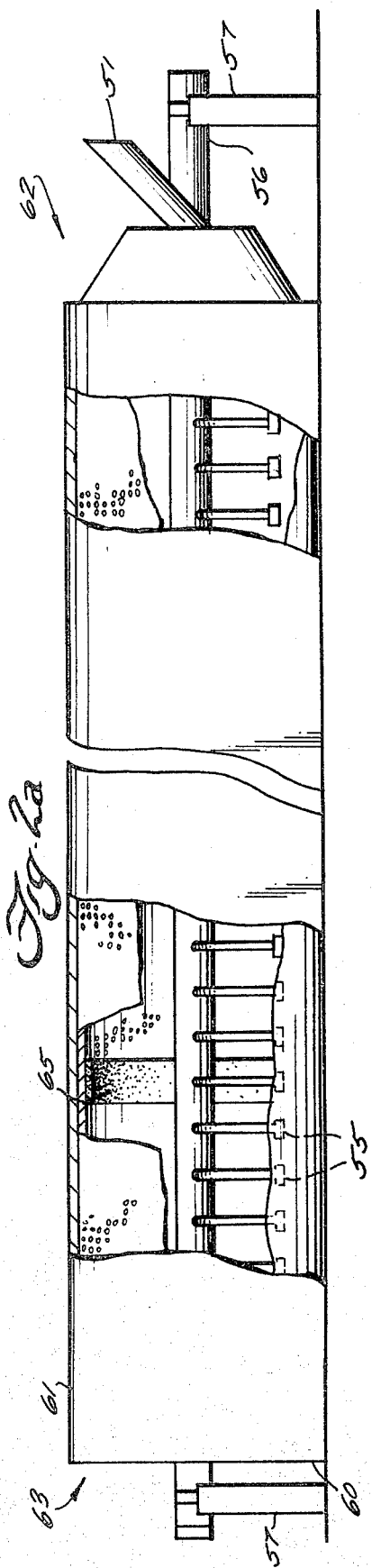
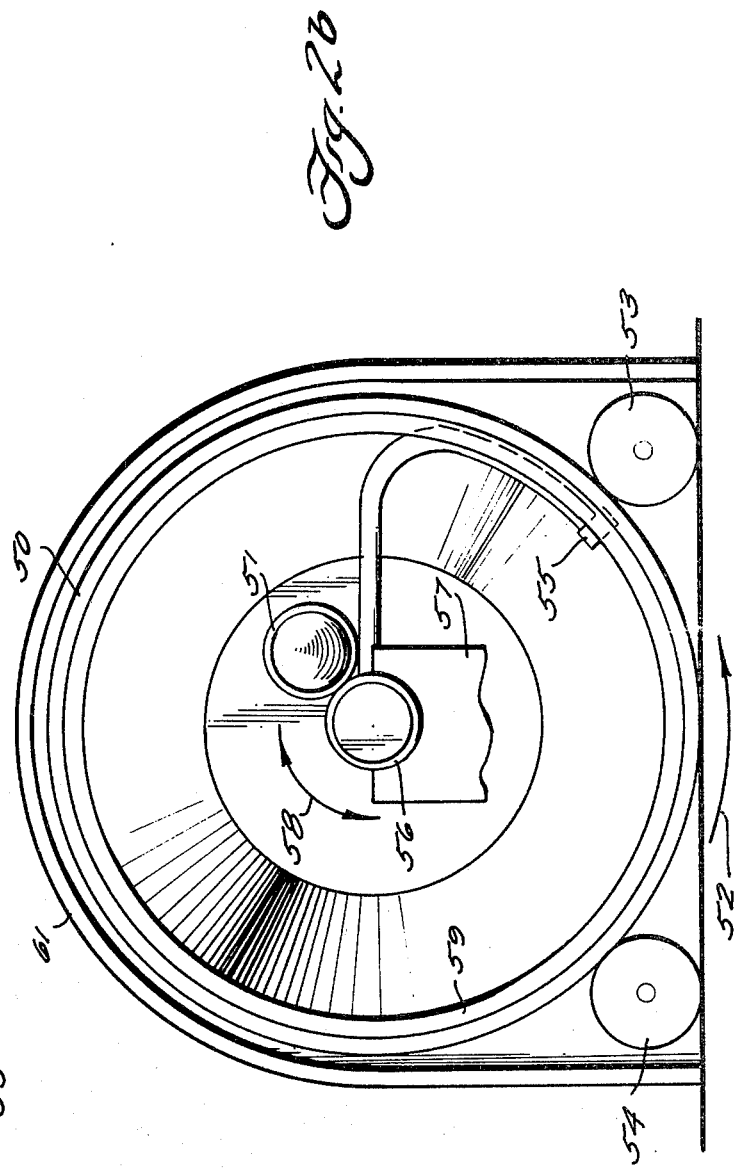

NUT BLANCHER

BACKGROUND OF THE INVENTION

The present invention relates to a device and a method for the blanching or skinning of raw or roasted peanuts and other nut products.

Various devices have been proposed for the removal of shells or skins from various materials. For example, the Lowe U.S. Pat. No. 1,581,071 and the Wilkerson U.S. Pat. No. 3,853,049 describe tomato peelers, the Southan U.S. Pat. No. 1,984,237 describes an onion skinner and the Harris U.S. Pat. No. 2,608,716 describes an oyster sheller. These devices have somewhat similar features to the vegetable washer of the Sells U.S. Pat. No. 1,381,510 and the bean polisher and dryer of the McFarland U.S. Pat. No. 1,645,440. Certain devices, such as those of the Powell U.S. Pat. No. 1,075,222 or the Magnuson U.S. Pat. No. 4,132,162 are said to be generally applicable to the peeling of fruits and vegetables.

Special considerations apply, however, with respect to the blanching of nuts such as peanuts. For example, peanuts are delicate and subject to splitting. The forces encountered in the removal of skins of vegetables may crush peanuts.

Accordingly, special devices have been developed for the treatment of peanuts. Thus, the Johnson U.S. Pat. No. 310,127 describes a peanut cleaner. Also, the Swart U.S. Pat. No. 3,242,958 describes a peanut sheller. However, it is noted that devices which remove the shells from peanuts are quite distinguishable from blanchers which remove only the skins therefrom.

The Green U.S. Pat. No. 2,702,574 describes a device for the removal of skins from nuts by an abrasive action along a conveyor. Furthermore, the Barnes, Jr. et al, U.S. Pat. No. 3,808,964 describes a funnel-shaped device for blanching heated or roasted peanuts, wherein skins are removed by the combined action of abrasive forces and an air stream. However, the device described in the Barnes, Jr. et al patent is said to be suitable only for small scale batch operations.

Accordingly, there is a need in the art for devices and methods for effectively blanching nuts in both large and small scale operations.

SUMMARY OF THE INVENTION

The present invention relates to a device and a process for removing (blanching) the skins of raw and roasted peanuts and other nut products.

Although, strictly speaking, peanuts are leguminous materials, it will be understood that for the purposes of the present invention the term "nuts" is intended to connote peanuts and similar nut-like materials.

In operation, the device may be described as a rotating cylinder preferably equipped with an abrasive or roughed liner and a plurality of air jets located interior to the revolving cylinder and positioned in a manner that causes the jet air flow to be directed counter to the rotation of the rotating drum. As the drum rotates the nuts in the cylinder move up the sides of the cylinder meeting "head-on" the jet of air which is flowing the opposite direction from the nuts. This "head-on" impact between the nuts and air jets removes the skins from the nuts. This impact between the air and peanuts moving in opposite directions has a much greater force and thus greater efficiency than if the air was directed other than opposite direction from the upward roll of the nuts.

In order to produce the desired "head-on" impact between nuts and air according to the present invention, it is not necessary to direct the air "exactly" contra to the rotation of the cylinder or "exactly" into the path of the upwardly rotating nuts. The direction of the air may be varied slightly from this exact direction. However, the direction of the air should be substantially contra to the rotation of the cylinder or substantially into the path of the upwardly rotating nuts. For example, the air may be directed within approximately 20° of the direction opposite to the rotation of said cylinder. It is also possible to situate jet orifices on a header such that the jets of air flow in slightly different directions, e.g., separated by an angle from about 10° to about 20°. For instance, an air tube may contain a header to which is attached three jet tips, one blowing straight ahead, one blowing 20° to the left and one directed 20° to the right of center. This gives a cross flow of jets of air that strike the peanuts at different angles as they tend to move up the side of the rotating cylinder, thus giving a better skin removal.

The present invention provides a method for either the continuous or batchwise blanching of nuts. For example, in the continuous unit as the cylinder rotates, preconditioned peanuts may be fed in at one end and discharged at a constant rate at the other end. As the peanuts enter the revolving cylinder and move forward, they tend to position slightly to the side due to the rotation of the cylinder. The air jets positioned at or slightly below the peak of the layer of peanuts blow the peanuts back down counter to the rotation of the drum. As the jets of air strike the nuts, the combination of abrasive action and the jets of air remove the skin from the nuts. The revolving cylinder may be made of either metal or plastic material. A perforated or expanded metal cylinder is preferred.

To augment the abrasive action of the cylinder, an abrasive insert or liner may be fitted into the metal cylinder. This abrasive insert or liner may be made from but not limited to roughed metal, plastic, rubberized material, sandpaper and the like. Good results are obtained with perforated or expanded metal alone along with the air jet. If inserts or liners are installed inside the cylinder and if the cylinder is made of perforated or expanded metal or made of rods no vacuum system is normally needed to clean up the skins and other materials from the nuts because this material would be blown out through the openings in the cylinder walls. If a non-perforated or non-expanded material is used for the cylinder, then a vacuum system installed inside the cylinder may be desirable. Good results are obtained by installing alternating strips of abrasive materials inside the metal cylinder to help abraid off the skins. This allows the skins to be removed through the walls of the unit by the force of the air and eliminates the need for a vacuum cleaning system.

For best results the raw nuts may be preconditioned in warm or hot air prior to blanching.

Normally, the moisture of the nuts should be below about 4% when introduced into the blancher. Under certain circumstances it may be desirable to preheat the raw nuts in hot water or aqueous solution prior to blanching. In this case the nuts should be at least partially dried with hot air prior to transferring into the revolving cylinder.

It is the primary object of the present invention to provide a versatile and effective method and apparatus for the removal of peanut skins and the like. This and other objects of the invention will become clear from an inspection of the detailed description of the invention, and from the appended claims.

BRIEF DESCRIPTION OF THE DRAWINGS

FIGS. 2a and 2b show a side view and an end view (discharge end), respectively, of a continuous type nut blancher.

DETAILED DESCRIPTION OF THE DRAWINGS

Figure 1B:
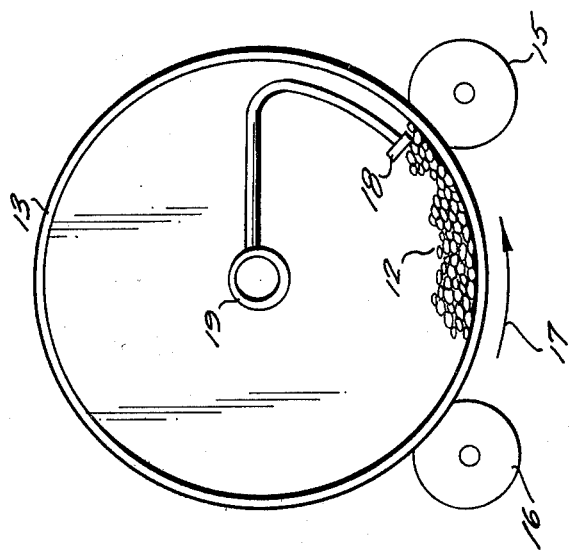
FIGS. 1a and 1b show a side view and an end view, respectively, of a batch type nut blancher.
Figure 1A:
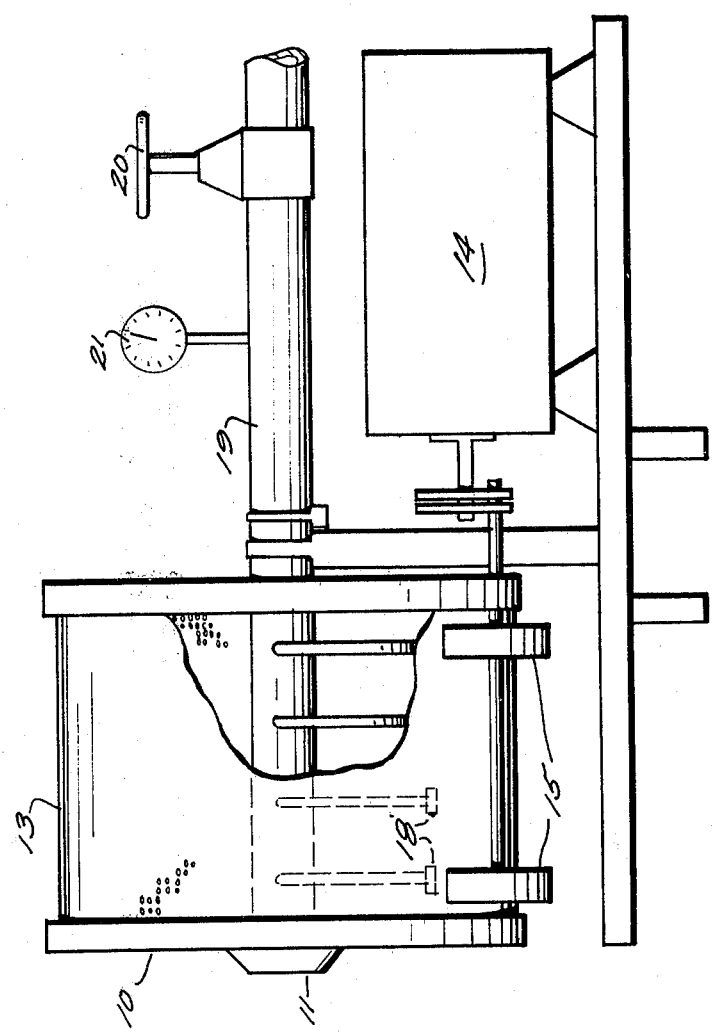

FIG. 1a and FIG. 1b show a side view and an end view, respectively, of a batch-type nut blancher. By removing the removable cover 10 by means of handle 11, nuts 12 may be introduced into cylinder 13. After replacing cover 10 on the nut containing cylinder 13, rotation of the cylinder may be initiated by means of motor 14 in operative connection with drive wheels 15. The rotation of the cylinder 13 is also influenced by means of idlers 16. Arrow 17 in FIG. 1b shows the direction of rotation of cylinder 13. It can be seen that the rotation of cylinder 13 causes a sideward displacement of nuts 12.

Air may be directed against nuts 12 by means of air nozzles 18 in operative connection with manifold 19 and valve 20. The pressure in manifold 19 may be determined from pressure gauge 21. It can be seen from FIG. 1b that the tips of air nozzles 18 are located at or slightly below the peak of the upwardly rotating nuts 12.

FIG. 2a and FIG. 2b show a side view and an end view (discharge end), respectively, of a continuous type nut blancher. Nuts (not depicted) may be continuously introduced into the cylinder 50 through inlet chute 51. While nuts are being introduced, the cylinder 50 is continuously rotating in the direction of arrow 52. The rate of rotation is influenced by drive wheels 53 and idlers 54.

Air is continuously directed against upwardly rotating nuts by means of nozzles 55 in operative connection with air manifold 56. This air manifold is supported by saddles 57 and, as illustrated in FIG. 2b, is capable of swivelling according to arrows 58 to permit the proper orientation of the tips of nozzles 55 with respect to nuts contained within cylinder 50.

If desired, a product dam 59 (a rim edge about the discharge end 60 of the cylinder 50 for flow control) may be provided.

After passing by product dam 59, blanched nuts are continuously removed at discharge opening 60. The entire cylinder 50 may be covered with hood 61.

Accordingly, as shown in FIG. 2a, nuts are continuously blanched as they move from the inlet end 62 to the discharge end 63 of the cylinder 50. To facilitate the movement of nuts through the cylinder 50, the cylinder may be slightly titled such that the inlet end 62 is slightly higher than discharge end 63. More particularly, the cylinder 50 may be titled downwardly 1° to 5° towards the discharge end 63, a tilt of 2° or 3 inches every 10 feet of length being preferred. Furthermore, the movement of nuts through the cylinder 50 may be influenced by the nature of the abrasive surface on the interior of the cylinder 50 or the positioning of the air nozzles 55 within the cylinder. Accordingly, while the cylinder 50 may be "exactly" horizontal, preferably in the continuous operation it is slightly tilted, but, in any event, it should be substantially horizontal (e.g., horizontal or tilted no more than about 5°).

It is desirable to use a cylinder 13, 50 wherein at least a portion of the innermost surface thereof is abrasive. For example, portions of this surface may be made abrasive by intermittently inserting about four inch strips of abrasive material—indicated generally at 65 in FIG. 2a—at intervals of about every twelve inches along the length of the cylinder. It is also preferred to use a cylinder 13, 50 which is sufficiently foraminous to permit the skins of nuts to pass therethrough. For example, a cylinder having holes of approximately one-quarter inch in diameter or less may be sufficient to retain nuts while still permitting the skins of the nuts to pass through the cylinder. A particular example of a foraminous cylinder which also has abrasive properties would be a perforated or expanded metal, stainless steel drum having 3/16 inch holes and 5/16 inch centers with the rough side in.

Figure 3B:
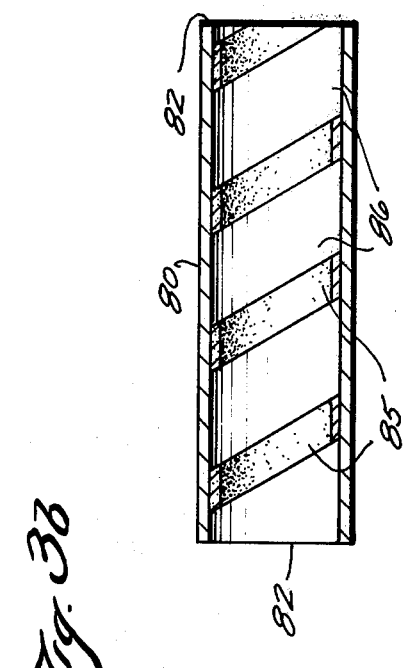
FIGS. 3a, 3b, 3c and 3d show examples of means for facilitating the movement of nuts through a continuous type nut blancher.
Figure 3D:
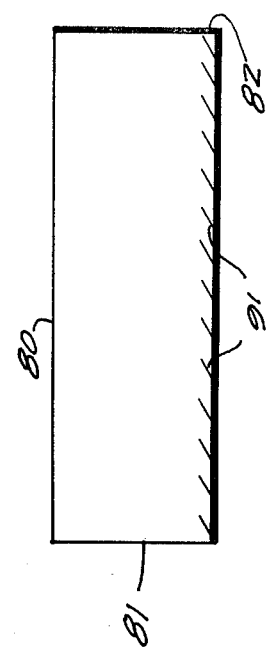
Figure 3A:
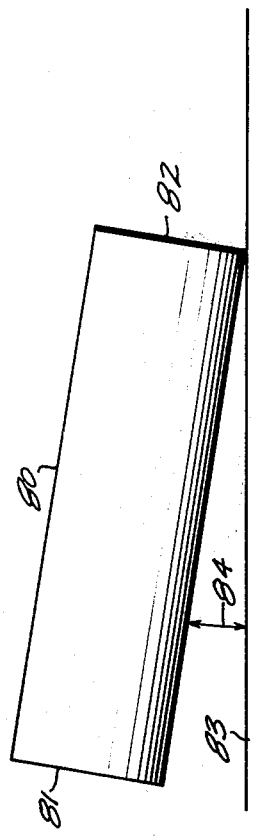

FIGS. 3a, 3b, 3c and 3d represent examples of means for facilitating the movement of nuts through a cylinder 80 of a continuous nut blancher from the inlet end 81 to the discharge end 82. FIG. 3a illustrates the preferred method of facilitating this movement by tilting the cylinder from horizontal 83 by an angle 84 of about 1° to 5°, preferably about 2°. The preferred 2° tilt angle may be achieved by raising the inlet end about 3 inches per 10 feet of cylinder length above the discharge end.

FIG. 3b demonstrates a spiral arrangement of abrasive 85 within the cylinder 80. The roughened surface of the abrasive 85 is thus interrupted smooth sections 86. When the cylinder 80 is rotated, the interior surface of the cylinder acts through frictional forces to move nuts much like a screw conveyor.

Figure 3C:
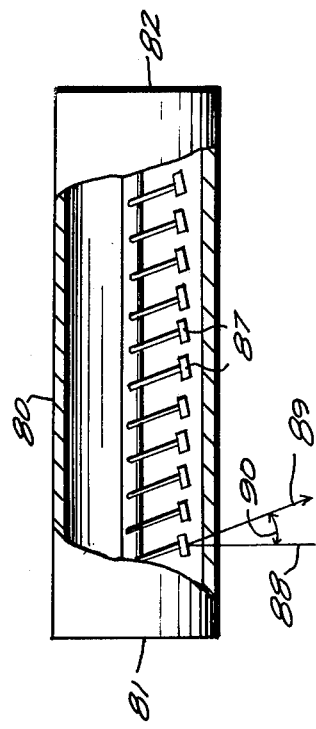

FIG. 3c represents a means by which the force of air may be used to facilitate the movement of nuts through the cylinder 80. In FIG. 3c, nozzles 87 on the interior of cylinder 80 are displaced slightly from vertical 88 towards discharge end 82 such that the general direction of air flow 89 forms a small angle with verticle 90. This angle of displacement should, however, be small enough (e.g., less than 10°) that air is directed substantially contra to the direction of rotation of the cylinder.

FIG. 3d shows the interior of cylinder 80 with an abrasive surface of ridges 91. These ridges 91 may be parts of perforations such that the inner surface of cylinder 80 appears much like a cheese grater. According to the arrangement of ridges 91 within the cylinder, these ridges might tend to push nuts towards discharge end (e.g., as per the spiral arrangement of FIG. 3b) or at least tend to prevent nuts from backing up in the cylinder towards inlet end 81.

Although the tilted cylinder depicted in FIG. 3a is the preferred means for facilitating proper movement of the nuts through continuous type nut blanchers, it will be understood other means such as those illustrated in FIGS. 3b, 3c and 3d may also be used in various combinations.

For best results, the raw nuts may be preconditioned in warm or hot air so that they have a moisture content of below about 4% when introduced into the cylinder 13, 50. In some instances, it may be desirable to preheat the raw nuts in hot water or aqueous solution before preconditioning.

The effects of preconditioning at a temperature from 175° to 325° for three to nine minutes are illustrated in Table 1:

TABLE 1.

EFFECT OF PRECONDITIONING TIME AND TEMPERATURE ON THE BLANCHING OF VIRGINIA PEANUTS. PEANUTS WERE BLANCHED 2 MINUTES AT 15 PSI.

| CONDITIONING TEMP. | MINUTES IN PREHEATER | % UNBLANCHED (SKINS) | % BLANCHED (WHOLE) | % BLANCHED (SPLITS) | % BLANCHED (Total) | WHOLE TO SPLIT Ratio |
|---|---|---|---|---|---|---|
| 175° F. | 3 | 44.6 | 44.6 | 10.8 | 55.4 | 4.1 |
| 175° F. | 6 | 35.0 | 54.4 | 10.6 | 65.0 | 5.1 |
| 175° F. | 9 | 29.9 | 58.3 | 11.9 | 70.2 | 4.9 |
| 225° F. | 3 | 12.6 | 70.6 | 16.8 | 87.4 | 4.2 |
| 225° F. | 6 | 6.2 | 78.0 | 15.8 | 93.8 | 5.0 |
| 225° F. | 9 | 5.8 | 76.9 | 17.4 | 94.2 | 4.4 |
| 275° F. | 3 | 8.7 | 72.5 | 18.9 | 91.3 | 3.8 |
| 275° F. | 6 | 4.0 | 73.4 | 22.7 | 96.0 | 3.2 |
| 275° F. | 9 | 2.5 | 69.8 | 27.8 | 97.5 | 2.5 |
| 325° F. | 3 | 4.9 | 71.1 | 24.0 | 95.1 | 3.0 |
| 325° F. | 6 | 1.4 | 62.2 | 36.4 | 98.6 | 1.7 |
| 325° F. | 9 | 0.5 | 48.2 | 51.4 | 99.5 | 0.9 |

As indicated in the drawings the air is directed substantially opposite to the direction of movement of the nuts at the time of impact of the air stream and nuts. The air jets may be suitably positioned and provided in quantity so that the jets direct air in slightly different directions (e.g. directing air streams from 0°-20° on either side of the direction of movement of the nuts at the time of impact between the air and nuts).

A commercial size unit may have a cylinder diameter ranging from about 10 to 20 inches and a length ranging from about 4 to 12 feet. The distance between air jets may range from 2 to 6 inches apart. A jet spacing of 3 inches (4 per foot) is effective.

The optimum air pressure in the jets varies according to the diameter of the jet orifice. Generally speaking, the air pressure in the manifold may range from 10 to 30 psi for a 5/64 inch orifice. An air jet with a 1/16 inch orifice needs a static air pressure above 50 psi for good results. An air jet with a 5/64 inch orifice preferably operates with a static air pressure between 15 and 25 psi. However, the jet orifice could be effective at any diameter between 1/16 and 3/16 inches with the proper air pressure.

The revolving cylinder may preferably rotate at the rate of about 50 to 90 rpm. This rate will depend to a degree on the diameter of the cylinder. If the rotation is too fast, an abnormal amount of split peanuts is obtained. If the rotation is too slow the efficiency is lower.

While certain representative embodiments and details have been shown for the purpose of illustrating the invention, it will be apparent to those skilled in the art that various changes and modifications may be made therein without departing from the spirit or scope of the invention. It will further be understood that the invention may comprise, consist essentially of or consist of the steps or materials recited herein.

What is claimed is:

1. A device for blanching nuts comprising: (a) a hollow cylinder capable of holding nuts therein and mounted for rotation about a substantially horizontal axis; (b) means for rotating said cylinder about said longitudinal axis so that nuts contained therein partially rotate therewith; and (c) air jet means disposed within said cylinder, for directing at least one jet of air within said cylinder substantially contra to the direction of rotation thereof so that the jet of air impacts the rotating nuts substantially head-on to effect removal of the skins thereof.

2. A device according to claim 1, wherein at least a portion of the innermost surface of said cylinder is abrasive.

3. A device as recited in claim 2 wherein said cylinder interior surface comprises a plurality of strips of abrasive material extending circumferentially around the interior of said cylinder and spaced from each other axially along the length of the cylinder.

4. A device according to claim 1, wherein said cylinder is sufficiently foraminous to permit the skins of nuts to pass therethrough.

5. A device according to claim 1, whereby said cylinder is a perforated metal cylinder having perforations approximately one-quarter inch in diameter or less.

6. A device according to claim 1, wherein said cylinder has a diameter ranging from about 10 to 20 inches and a length ranging from about 4 to 12 feet.

7. A device according to claim 1, wherein said jet of air travels in a direction which is within approximately 20 degrees of the direction opposite to the rotation of said cylinder.

8. A device according to claim 1, wherein said air jet means comprises a header to which is attached a plurality of jet tips such that the jets of air from said jet tips flow in slightly different directions.

9. A device according to claim 1, wherein said air jet means comprises a plurality of jet tips spaced about 2 to about 6 inches apart along the length of said cylinder.

10. A device according to claim 1, wherein said air jet means comprises a manifold connected to an orifice, in which said orifice has a diameter between about 1/16 and about 3/16 inches.

11. A device as recited in claim 1 wherein said air jet means comprises a header tube extending centrally through said cylinder along the axis of rotation thereof, a plurality of conduits extending outwardly from said header, said conduits extending first radially from said header, then having a curved portion, and then extending arcuately with substantially the same radius of curviture of said cylinder.

12. A device as recited in claims 1, 7, 8, or 9 further comprising means for mounting said air jet means within said cylinder so that the direction of the air jet may be readily adjusted.

* * * * *